UNITED STATES PATENT OFFICE 2,352,752

ACID WOOL DYESTUFFS

Werner Zerweck and Ernst Heinrich, Frankfort-on-the-Main-Fechenheim, Germany, assignors to General Aniline & Film Corporation, New York, N. Y., a corporation of Delaware No Drawing. Application May 29, 1941, Serial No. 395,787. In Germany December 18, 1940

2 Claims. (Cl. 260—374)

Our present invention relates to acid wool dyestuffs more particularly to those of the general formula:

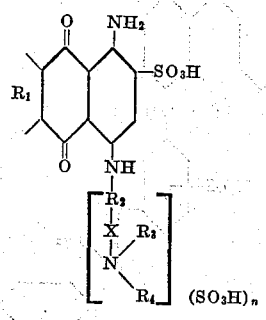

wherein $R_1$ and $R_2$ stand for a radicle of the benzene series, X for a member of the group consisting of alkylene, O-alkylene and S-alkylene radicles, $R_3$ and $R_4$ for a member of the group consisting of alkyl, cyclohexyl, benzyl and aryl radicles of the benzene series, $n$ for a number from 1 to 4; at the most one alkyl-group being present.

The process for producing the present new dyestuffs according to one feature of the invention consists in condensing a 1-amino-4-halogen-anthraquinone-2-sulfonic acid with an amine of the general formula:

$$H_2N-R_2-X-N\diagup^{R_3}_{R_4}$$

wherein $R_2$, X, $R_3$ and $R_4$ have the aforesaid signification and generally, but not in all cases, aftertreating the condensation products thus formed with a sulfonating agent.

In the case of both $R_3$ and $R_4$ standing for aryl radicles, or $R_3$ for benzyl and $R_4$ for an aryl radicle, the condensation is advantageously carried out while using an amino compound containing in at least one of the radicles signified by $R_3$ and $R_4$ a sulfonic acid group.

According to a further feature of the invention dyestuffs of the same class are obtained by condensing a 1-amino-2.4-dihalogen-anthraquinone with an amine of the aforesaid kind and replacing in the molecule of the condensation product the halogen atom standing in the 2-position of the anthraquinone nucleus by the sulfonic acid group.

The present new dyestuffs are distinguished by a particular levelling power and dye wool mostly bluish shades of good fastness properties particularly of a good fastness to light.

In order to further illustrate our invention the following examples are given, the parts being by weight and all temperatures in degrees centigrade.

Example 1

50 parts of 1-amino-4-bromanthraquinone-2-sulfonic acid are dissolved in about 1500 parts of water and a solution of 42 parts of 3-amino-benzyl-dicyclohexylamine in about 500 parts of alcohol moreover 50 parts of sodium bicarbonate and 5 parts of cuprous chloride are added thereto. The mixture is heated for some hours to boiling. After acidification the formed condensation product separates. It is filtered off and well washed out with water.

10 parts thereof are dissolved in a mixture of 50 parts of sulfuric acid monohydrate and of 10 parts of fuming sulfuric acid of 20 percent strength. The reaction mass is maintained over night at a temperature of 40 to 45° and then ice is added thereto. The separated dyestuff is filtered off, washed with a concentrated salt solution until a neutral reaction and converted into the sodium salt by dissolving it in an aqueous sodium carbonate solution.

The dyestuff thus obtained of the formula:

dyes wool reddish blue shades of a good fastness to light. It has a good levelling power.

Dyestuffs of a similar shade of likewise good fastness properties are obtained by using as second reaction component 3-aminobenzyl-(methyl-cyclohexyl)-amine or 3-amino-benzyl-(ethyl-cyclohexyl)amine. Dyestuffs, which dye wool somewhat more greenish blue shades are obtained when starting for instance from 2.4-dimethyl-5-amino-benzyl-(ethyl-cyclohexyl)-amine or from 4.5-dimethyl-3-amino-benzyl-(dicyclohexyl)-amine. When using as component 3-amino-4-methoxy-benzyl-(methyl-cyclohexyl)-amine the formed dyestuff dyes wool distinctly more greenish blue shades, and dyestuffs, which dye wool somewhat more reddish blue shades are obtained, when starting from 2.4-dimethyl-3-amino-benzyl-(ethyl-cyclohexyl)-amine or 2.4-dimethyl-3-amino-benzyl-(dicyclohexyl)-amine.

*Example 2*

A mixture of a solution of 100 parts of 1-amino-4-bromo-anthraquinone-2-sulfonic acid in about 5200 parts of water, of 100 parts of sodium bicarbonate, 10 parts of copper sulfate and of an alcoholic solution of 66 parts of 3-amino-benzyl-(methyl-benzyl)-amine is heated for some hours to boiling and the formed condensation product is separated by acidification. It is filtered off, well washed with water and dried.

By a subsequent sulfonation as described in Example 1 a dyestuff of the formula:

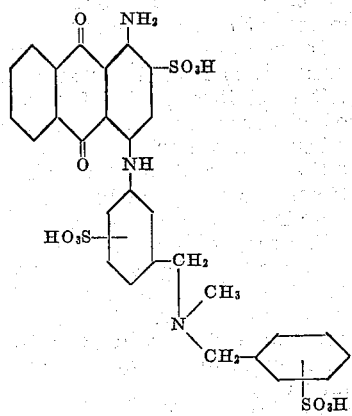

is obtained which dyestuff dyes wool clear reddish blue shades of a good fastness to light, water, washing, fulling, seawater and perspiration. It has a good levelling power.

Further valuable dyestuffs of similar tinctorial properties are obtained while using as component 3-amino-benzyl-(hexyl-benzyl)-amine, 3-amino-benzyl-(cyclohexyl-benzyl)-amine, 3-amino-benzyl-(dibenzyl)-amine or the isomeric compounds being substituted accordingly in the 4-position of the benzene nucleus, moreover by starting for instance from 2.4-dimethyl-5-amino-benzyl-(methyl-benzyl)-amine, 3-amino-4-methoxy-benzyl-(methyl-benzyl)-amine or 4-aminophenetidyl-(methyl-benzyl)-amine of the formula:

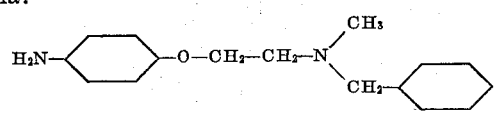

or the corresponding thiocompound of the formula:

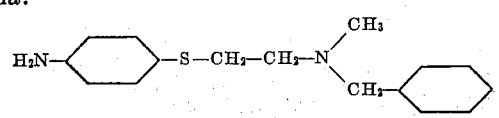

*Example 3*

100 parts of 1-amino-4-bromanthraquinone-2-sulfonic acid are dissolved in about 5200 parts of water and a solution of 66 parts of 3-amino-benzyl-(methyl-phenyl)-amine in about 1800 parts of alcohol, then 100 parts of sodium bicarbonate and 10 parts of cuprous chloride are added. The mixture is heated to boiling for some hours. The formed condensation product is isolated as described in the foregoing examples.

10 parts thereof are dissolved in a mixture of 50 parts of sulfuric acid-monohydrate and 10 parts of fuming sulfuric acid of 20 percent strength. The reaction mass is held over night at 40 to 45° and then ice is added. The separated dyestuff is filtered off, washed out with a concentrated salt solution until a neutral reaction and converted into the sodium salt by dissolving it in a sodium bicarbonate solution.

The dyestuff thus obtained of the formula:

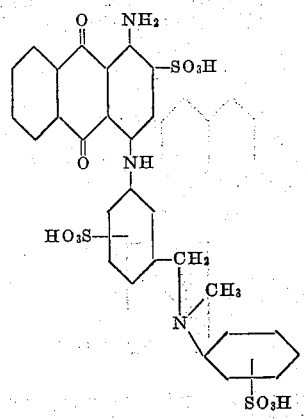

dyes wool reddish blue shades of a good fastness to light, water washing, fulling, seawater and perspiration and has a sufficient levelling power.

When starting from 2-aminophenetidyl-(methyl-phenyl)-amine of the formula:

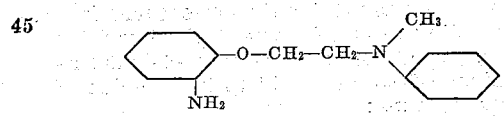

or the corresponding thiocompound or from 3-amino-benzyl-(ethyl-phenyl)-amine, 3-amino-benzyl-(cyclohexyl-phenyl), amine, or the isomeric compounds being accordingly substituted in the 4-position of the benzene nucleus similar dyestuffs are obtained.

Dyestuffs of a more greenish blue shade are obtained when starting from 2.4-dimethy-5-amino-benzyl-(methyl-phenyl)-amine, 4.5-dimethyl-3-amino-benzyl-(ethyl-phenyl)-amine, 3-amino-6-methoxy-benzyl-(methyl - phenyl) - amine or from 3-amino-benzyl-(2'-methylphenyl-ethane-sulfonic acid) of the formula:

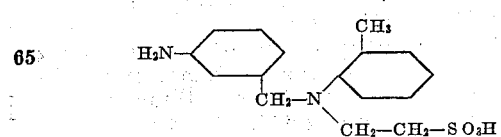

or when condensing instead of the 1-amino-4-bromanthraquinone-2-sulfonic acid the corresponding 5-methoxy-acetylamino or 5-acetylamino-compounds or the 1-amino-4-iodinoanthraquinone-2.6-disulfonic acid with the aforesaid amino compounds.

In the case where a sulfonic acid group is present in the alkylradicle or in 6-position of the anthraquinone nucleus, a subsequent sulfonation of the condensation product may be carried out or may be left undone.

Dyestuffs of a somewhat more reddish blue shade are obtained when starting from 2.4-dimethyl-3-amino-benzyl-(methyl-phenyl)-amine or from 2.4-dimethyl-3-amino-benzyl-(ethylphenyl)-amine.

Example 4

A mixture of a solution of 100 parts of 1-amino-4-bromanthraquinone-2-sulfonic acid in about 5200 parts of water, of a solution of 72 parts of 3-amino-benzyl-(hydroxethyl-phenyl)-amine in about 1800 parts of alcohol, 100 parts of sodium bicarbonate and 10 parts of cuprous chloride is heated for some hours to boiling. The condensation is isolated as described in the foregoing examples.

10 parts thereof are dissolved in 60 parts of sulfuric acid-monohydrate and the solution is held for about 6 hours at room temperature. The formed sulfonation product is isolated as described in the foregoing examples.

The dyestuff thus obtained of the formula:

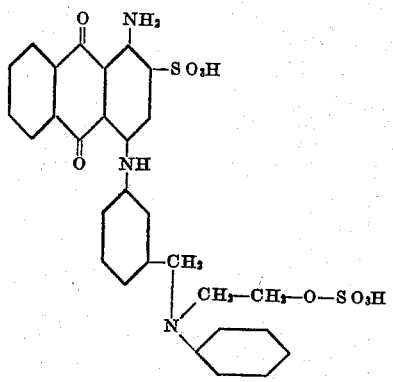

dyes wool reddish blue shades of a good fastness to light.

When carrying out the sulfonation process as described in the foregoing examples a dyestuff of the formula:

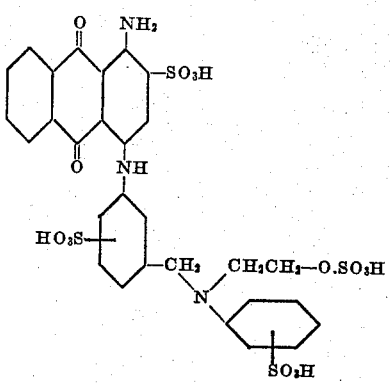

of similar tinctorial properties is obtained.

When starting from 2.4-dimethyl-5-aminobenzyl-(hydroxethyl-phenyl)-amine or from 4.5-dimethyl-3-amino-benzyl-(hydroxethyl-phenyl)-amine dyestuffs of a somewhat more greenish blue shade are obtained and a dyestuff of a somewhat more reddish blue shade is obtained when starting from 2.4-dimethyl-3-amino-benzyl-(hydroxethyl-phenyl)-amine.

Example 5

A mixture of a solution of 50 parts of 1-amino-4-bromoanthraquinone-2-sulfonic acid in about 2000 parts of water, 60 parts of 3-amino-benzyl-(benzyl-aniline-2'-sulfonic acid), 50 parts of sodium bicarbonate and 5 parts of cuprous chloride is heated for some hours on the boiling water bath. When the formation of the dyestuff has been finished the solution is filtrated and the dyestuff is precipitated by adding sodium chloride and advantageously purified by redissolving in water. The new dyestuff of the formula:

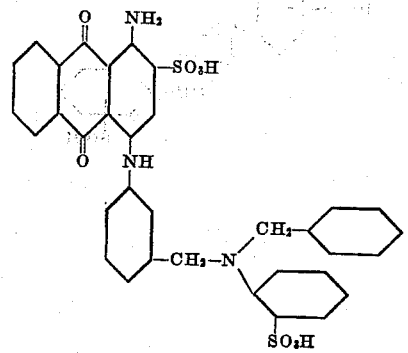

dyes wool clear reddish blue shades of a good fastness to light, water, washing, fulling, seawater and perspiration. It has a good levelling power.

When using as aminocompound the 3-amino-benzyl-diphenylamine-4'-sulfonic acid the formed dyestuff of the formula:

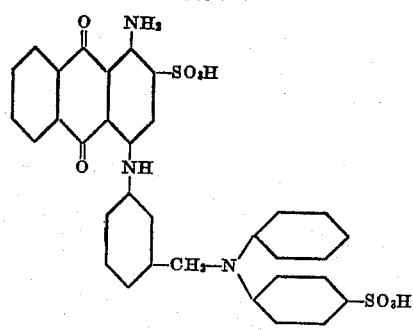

dyes wool somewhat more greenish blue shades of likewise good fastness properties.

When after treating both dyestuffs with a mixture of sulfuric acid and fuming sulfuric acid as described in the foregoing examples, dyestuffs containing probably two further sulfonic acids groups are obtained, dyeing wool similar shades of similar fastness properties as the starting dyestuffs.

We claim:

1. Acid wool dyestuffs of the general formula:

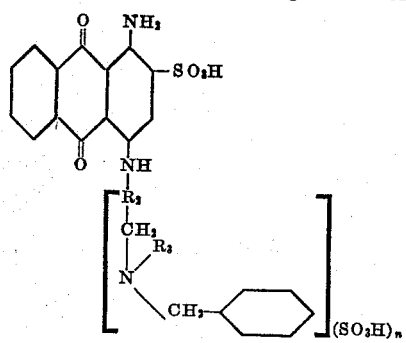

wherein $R_2$ stands for a phenylene radical, $R_3$ for a member of the group consisting of alkyl, cyclohexyl and benzyl radicals and $n$ for a number from 1 to 4.

2. The acid wool dyestuff of the formula:

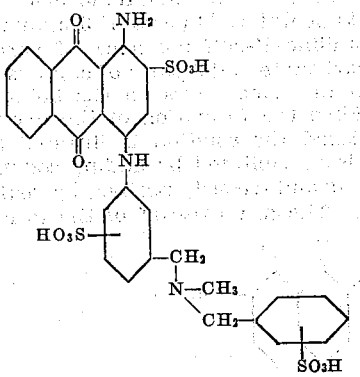

obtainable by condensing the 1-amino-4-bromanthraquinone-2-sulfonic acid with 3-aminobenzyl-(methyl-benzyl)-amine and subjecting the formed condensation product to a sulfonation which dyestuff dyes wool clear reddish blue shades of a good fastness to light, water, washing, fulling, seawater and perspiration, and has a good leveling power.

WERNER ZERWECK.
ERNST HEINRICH.